United States Patent
Marrot et al.

(10) Patent No.: US 8,901,269 B2
(45) Date of Patent: Dec. 2, 2014

(54) CROSS-LINKABLE SILICONE COMPOSITION FOR THE PRODUCTION OF NON-STICK COATINGS FOR FLEXIBLE SUBSTRATES AND AN ATTACHMENT-PROMOTING ADDITIVE CONTAINED IN SAID COMPOSITION

(75) Inventors: Sébastien Marrot, Lyons (FR); John White, Chessy les Mines (FR); Michel Feder, Villeurbanne (FR); Frédéric Magd, Tassin la Demi Lune (FR)

(73) Assignee: Bluestar Silicones France SAS, Saint Fons (FR)

( * ) Notice: Subject to any disclaimer, the term of this patent is extended or adjusted under 35 U.S.C. 154(b) by 166 days.

(21) Appl. No.: 13/636,658

(22) PCT Filed: Mar. 22, 2011

(86) PCT No.: PCT/EP2011/054333
§ 371 (c)(1),
(2), (4) Date: Apr. 9, 2013

(87) PCT Pub. No.: WO2011/117230
PCT Pub. Date: Sep. 29, 2011

(65) Prior Publication Data
US 2013/0190470 A1    Jul. 25, 2013

(30) Foreign Application Priority Data
Mar. 22, 2010 (FR) .................................... 10 01125

(51) Int. Cl.
*C08G 77/14* (2006.01)
*C09D 183/04* (2006.01)
*C08G 77/38* (2006.01)

(52) U.S. Cl.
CPC ............. *C09D 183/04* (2013.01); *C08G 77/38* (2013.01)
USPC ............................................ 528/27; 524/588

(58) Field of Classification Search
None
See application file for complete search history.

(56) References Cited

U.S. PATENT DOCUMENTS

| | | | | |
|---|---|---|---|---|
| 4,077,943 | A * | 3/1978 | Sato et al. | 528/15 |
| 5,051,467 | A * | 9/1991 | Okinoshima et al. | 524/731 |
| 5,120,810 | A * | 6/1992 | Fujiki et al. | 528/15 |
| 5,169,919 | A * | 12/1992 | Terae et al. | 528/15 |
| 5,384,075 | A * | 1/1995 | Okami | 252/511 |
| 5,438,094 | A * | 8/1995 | Fujiki et al. | 524/730 |
| 5,789,084 | A * | 8/1998 | Nakamura et al. | 428/447 |
| 6,387,520 | B1 * | 5/2002 | Fujiki et al. | 428/447 |
| 7,059,627 | B2 * | 6/2006 | Ikeno et al. | 280/728.1 |
| 7,307,122 | B2 * | 12/2007 | Ikeno et al. | 524/862 |
| 7,641,980 | B2 * | 1/2010 | Ikeno et al. | 428/447 |
| 2009/0123764 | A1 * | 5/2009 | Morita et al. | 428/446 |
| 2010/0028625 | A1 * | 2/2010 | Kagata et al. | 428/195.1 |

FOREIGN PATENT DOCUMENTS

EP     0159693 B1     1/1989

OTHER PUBLICATIONS

Gelest calalog, Reactive Silicones: Forging new polymer links, 64 pages, date not given.*

* cited by examiner

*Primary Examiner* — Robert S Loewe
(74) *Attorney, Agent, or Firm* — Miles & Stockbridge P.C.

(57) ABSTRACT

The invention relates to cross-linkable or cross-linked silicone compositions that can be used, in particular, to form a non-stick water-repellent coating for flexible substrates, for example paper or similar, in the form of natural or synthetic polymer films.

20 Claims, No Drawings

CROSS-LINKABLE SILICONE COMPOSITION FOR THE PRODUCTION OF NON-STICK COATINGS FOR FLEXIBLE SUBSTRATES AND AN ATTACHMENT-PROMOTING ADDITIVE CONTAINED IN SAID COMPOSITION

CROSS REFERENCE TO RELATED APPLICATIONS

This application is a §371 National Stage Application of PCT/EP2011/054333, filed Mar. 22, 2011, which claims priority to French Application No. 1001125, filed Mar. 22, 2010.

BACKGROUND OF THE INVENTION

1. Field of the Invention

The field of the invention is that of cross-linkable or cross-linked silicone compositions that can be used in particular to form a non-stick and water-repellent coating or film for flexible substrates, for example made of paper or the like, and in the form of natural or synthetic polymer films.

2. Description of Related Art

These hardenable non-stick silicone compositions are applied to such substrates so as to facilitate the removal of adhesive materials that are reversibly glued to these substrates.

These liquid silicone compositions are applied to the substrate films in industrial coating devices comprising cylinders operating at very high speed (for example 600m/min). It is clear that in these coating procedures at very high speed, the viscosity of the liquid silicone coating composition should be meticulously adjusted to the coating operating conditions.

In practice, the rate of deposition of non-stick silicone is between 0.1 and 2, preferably 0.3 and 1 g/m$^2$, which corresponds to thicknesses of the order of a micrometer. Once applied to the flexible substrate, the silicone composition cross-links to form a solid water-repellent and/or non-stick silicone coating (for example elastomer).

Given the industrial rates of coating at very high speed, the kinetics of cross-linking should be extremely rapid to lead to proper cross-linking, that is to say that the non-stick silicone films should be sufficiently cross-linked in order to be able to fulfill as much as possible their role of anti-adhesion and have the desirable mechanical qualities. Assessment of the quality of cross-linking of the non-stick silicone coating may in particular be made through the assay of the non-cross-linked extractable compounds whose quantity should be as low as possible. For example, the amount of extractable materials is preferably less than 5%, under normal industrial cross-linking conditions.

The anti-adhesion of the free outer face of the silicone coating is expressed through the peeling force, which should be weak and controlled, for the element intended to be placed on the substrate coated by the non-stick silicone coating. Conventionally, this element may be the adhesive face of a label or of a tape with the same name.

Accordingly, in addition to this weak and controlled anti-adhesion, the adhesion of the silicone coating on its substrate should be very high. This property of adhesion is assessed, for example, using the rub-off trade test which consists in rubbing the surface of the coating with the finger and in measuring the number of successive passes before damage of the coating.

It is also important that these silicone coating compositions, which can be cross-linked by hydrosilylation, for example Si—H/Si-Vi, have the longest possible lifetime at room temperature when they are in the form of a coating bath in industrial coating machines.

The flexible substrates coated with a non-stick silicone film may be for example:
a paper or a polymer film of the polyolefin type (polyvinyl chloride (PVC), Polypropylene or Polyethylene) or of the polyester type (Polyethylene terephthalate or PET),
an adhesive tape whose inner face is coated with a layer of pressure-sensitive adhesive and whose outer face comprises the non-stick silicone coating;
or a polymer film for protecting the adhesive face of a pressure-sensitive self-adhesive or adhesive element.

For obvious reasons of handling safety and toxicity, silicone compositions that are advantageously free of solvent are sought in the present invention.

Beyond this aspect, it is preferable, from an economic point of view, that these silicone coating compositions that are advantageously solvent free can be used on standard industrial coating machines suitable for flexible substrates made of paper. This assumes that said compositions have a relatively low viscosity (for example less than or equal to 1000 mPa·s) in order to facilitate their handling, in order to have a good coating quality and in order to reduce the problem of formation of mist (misting) which appears at very high industrial coating speeds.

Another constraint to be taken into account for the formulation of the liquid silicone coating compositions is that the coefficient of friction of the cross-linked silicone elastomer coating should be controllable, so as to facilitate the operations of rolling up/unrolling the flexible substrates made of polymer (in particular of polyester such as PET), which are useful as liners for labels.

It is important for this application that the elastomer silicone coating does not adversely affect the smooth appearance, or the transparency or the mechanical properties of the substrate. The smooth appearance and the mechanical properties are necessary for precision stripping at very high speed. The transparency is desirable for the high-speed inspection of the regularity of the film, using optical detectors.

In a non-stick coating, controlling the peeling force is important. Advantageously, this control should be effective at low and high speed. The equilibrium between the peeling forces at low speed and the peeling forces at high speed is commonly called the anti-adhesion profile.

Beyond the properties mentioned above, for all substrates it is first and foremost advisable that the adhesion or attachment of the silicone coating on the substrate (represented by the rub-off abrasion resistance) is optimum and stable over time, this being so even in the presence of the adhesive for the label.

Now, in the context of the invention, there is a focus more especially on the optimization of this parameter of adhesion or attachment of the silicone coating on the substrate, without detriment to the other specifications.

Non-stick silicone compositions are known from application EP159693-A2 which have improved adhesion on paper or polymer substrates and which comprise alkenylated linear polyorganosiloxanes $M^{Vi}_{2-5}$ $D_{50-1000}$ $T_{a'''\geq0}$ $M_{0-0.5}$, linear polyorganosiloxanes with hydrogenosiloxyl units (≡Si—H), a platinum catalyst, a cross-linking inhibitor, and, as attachment-promoting additive, one of the polyorganosiloxanes of the MD$_x$M type bearing functional grafts of the epoxy, oxirane or carboxy type. More precisely, this additive may be of the M[D$^{AGE}$]$_x$D'M [AGE=allylglycidylether] or M[D$^{alkoxysilyl}$]$_x$ [D$^{carboxy}$]$_x$D'M, with D'=hydrogenosiloxyl unit (≡Si—H). This additive has the major disadvantage of not being able to be formulated with conventional cross-linking oils having hydrogenosiloxyl units. Indeed, when this type of additive is formulated with a cross-linking silicone oil having hydrogenosiloxyl units, phenomena of cloudiness and demixing appear in the formulation.

SUMMARY

In this context, the main aim of the present invention is to provide novel liquid silicone coating compositions which are advantageously free of solvent and which can be cross-linked instantaneously into a water-repellent and/or non-stick coating for a flexible substrate, producing cross-linked silicone coatings of a very high quality, in particular in terms of their attachment/adhesion to the substrate (no rub-off phenomenon) and anti-adhesion profile (sufficiently high peeling force at high speed), the latter properties resulting in particular from an attachment-promoting additive.

Another main aim of the invention is to provide novel liquid silicone coating compositions which are advantageously free of solvent and which can be cross-linked rapidly into a water-repellent and/or non-stick coating for flexible substrates, and which comprise an attachment-promoting additive that is both efficient and without any harmful effects on the preservation of said compositions.

Another main aim of the invention is to provide novel liquid silicone coating compositions, additivated with an improved attachment promoter, which are advantageously free of solvent and which can be cross-linked rapidly into a water-repellent and/or non-stick coating for flexible substrates, such as paper or polymer films of the polyolefin type (polyvinyl chloride (PVC), polypropylene or polyethylene) or polyester type (polyethylene terephthalate—PET-).

Another main aim of the invention is to provide novel liquid silicone coating compositions, additivated with an improved attachment promoter, which make it possible to prepare a cross-linked coating on a flexible having:
  on the one hand, sufficient cross-linking to have appropriate mechanical and adhesion properties of the coating,
  and, on the other hand, a low amount of extractable materials for a good permanency of the non-stick properties which is preferable in particular for the preparation and use of adhesive labels obtained from these complexes.

Another main aim of the invention is to provide novel liquid silicone coating compositions, additivated with an improved attachment promoter, which are advantageously free of solvent and which can be cross-linked into a water-repellent and/or non-stick coating for flexible substrates, this cross-linking being carried out rapidly at moderate temperature, these compositions being moreover endowed with long bath lifetimes, at room temperature.

Another main aim of the invention is to provide novel liquid silicone coating compositions, additivated with an improved attachment promoter, which can be cross-linked into a water-repellent and/or non-stick coating for a flexible substrate, and which are easy to prepare and are inexpensive.

Another main aim of the invention is to provide a novel improved attachment promoter which is at least as efficient as known promoters and has no harmful effect on the preservation of the composition.

Another main aim of the invention is to provide a novel process for producing a non-stick and water-repellent coating on a flexible substrate (for example a paper or a polymer), having more especially improved attachment properties (rub-off) in particular by virtue of an attachment-promoting additive, while moreover satisfying the requirements of controlling the peeling force profile, the low amount of extractable materials and the appropriate coefficient of friction, all this with a starting composition which is advantageously free of solvent, and has a viscosity which is compatible with coating at high speed without misting.

Another main aim of the invention is to provide a novel process for increasing the attachment (that is to say the abrasion resistance) of a non-stick and water-repellent cross-linked/hardened silicone coating which is applied to any substrate (for example paper or polymer), and which is obtained from a silicone composition capable of cross-linking/hardening by polyaddition and comprising an improved and efficient adhesion-promoting additive.

Another main aim of the invention is to provide a novel flexible substrate (for example paper or polymer), having at least one non-stick water-repellent coating, based on a silicone composition cross-linked/hardened by polyaddition, and having excellent properties of attachment (rub-off), of controlling the peeling force profile, of hardness (% of extractable materials) and of appropriate coefficient of friction, all this while starting with a starting composition which is advantageously free of solvent and has a viscosity which is compatible with coating at high speed without misting.

These aims, among others, are achieved by the present invention which relates firstly to a novel silicone composition A comprising a silicone base B capable of cross-linking or hardening by polyaddition, characterized in that it comprises at least one cross-linking and attachment-promoting additive X comprising at least one polyorganosiloxane C comprising the siloxyl units (I.1) to (I.3) having the following formulae:

 (I.1)

 (I.2)

 (I.3)

in which:
  a=1 or 2, b=0, 1 or 2 and a+b=1, 2 or 3;
  c=1, 2 or 3
  d=1 or 2, e=0, 1 or 2 and d+e=1, 2 or 3
  Y independently represents an epoxyfunctional hydrocarbon group optionally comprising one or more heteroatoms such as an oxygen atom, preferably having from 2 to 20 carbon atoms inclusive, and, more preferably still, chosen from the group consisting of an alkyl glycidyl ether, a linear, branched and/or cyclic epoxyalkyl, a linear, branched and/or cyclic epoxyalkenyl and a carboxylic acid glycidyl ester;
  $Z^1$, $Z^2$ and $Z^3$ represent, independently of each other, a monovalent hydrocarbon group having from 1 to 30 carbon atoms optionally comprising one or more heteroatoms and preferably chosen from the group consisting of alkyl groups having from 1 to 8 carbon atoms inclusive and aryl groups, and, more preferably still, chosen from the group consisting of a methyl, ethyl, propyl, 3,3,3-trifluoropropyl, xylyl, tolyl and phenyl radical,
  said polyorganosiloxane C comprising, per molecule, at least one siloxyl unit (I.1) bearing epoxyfunctional hydrocarbon groups and at least three siloxyl units (I.3) bearing hydrogenosiloxyl groups, and
  the content of siloxyl units (I.1) is less than or equal to 100 mmol per 100 g of polyorganosiloxane C, preferably between 10 and 80 mmol per 100 g of polyorganosiloxane C, and more preferably still between 20 and 60 mmol per 100 g of polyorganosiloxane C.

DETAILED DESCRIPTION OF A PREFERRED EMBODIMENT

It is to the credit of the inventors to have developed a novel particularly effective cross-linking and attachment-promoting additive X comprising a polyorganosiloxane C comprising:

epoxy-functionalized siloxyl units, and
at least three hydrogenosiloxyl units.

Accordingly, it has been discovered, quite fortuitously and unexpectedly, that by keeping the content of epoxy-functionalized siloxyl units (I.1) of the polyorganosiloxane C less than or equal to 100 mmol per 100 g of polyorganosiloxane, then the additive according to the invention no longer exhibits a problem of formation of cloudiness and of demixing when it is formulated with standard cross-linking silicone oils commonly used in the technical field of the invention.

It also has the advantage of being preserved for an extended period, in a non gelled liquid state suitable for use in a composition to be deposited on a substrate in order to form a non-stick coating.

It should be noted that the attachment properties on the substrate are all the more positive if they last for a sufficiently long period, at least from a few days to a few weeks, under severe moisture and/or temperature conditions. This durability is all the more remarkable if it is also observed when the non-stick coating is in contact with the adhesive, in particular when the latter is an acrylic.

By virtue of the invention, the coatings obtained not only have excellent attachment (rub-off), but are also endowed with a sufficiently high peeling force at high speed and with good mechanical and physical properties (smooth appearance, transparency and good coefficient of friction).

The performances achieved by virtue of the invention in terms of quality of cross-linking by polyaddition: reactivity/level of cross-linking/kinetics, are most advantageous, as demonstrated by the low amounts of extractable materials obtained, as regards the reactivity and the level of cross-linking.

The coating obtained is particularly adhesive on the substrate, makes it possible to provide anti-adhesion (release) properties in relation to adhesives of the pressure-sensitive adhesives type, and exhibits excellent mechanical strength upon prolonged contact with these adhesives, including acrylics.

These advantageous characteristics are particularly capable of being used in order to obtain the anti-adhesion of flexible substrates, for example paper or polymer, which are useful, for example, as liners for self-adhesive labels (pressure-sensitive adhesive), provided in the form of film rolls or reels, for example, manufactured at very high speed.

This is all the more advantageous since these results are obtained with a silicone composition, the rheological behavior of the silicone composition not being affected (not too viscous), such that it is perfectly capable of being coated onto any substrate and in particular onto any flexible substrate and that it is scarcely or not subject to misting under industrial coating conditions.

In addition, the silicone coating compositions according to the invention may be advantageously "free of solvent". This means that they do not contain any solvent and, in particular, are free of organic solvent. The advantages which this provides can be easily conceded as this involves health and safety.

According to a preferred embodiment, the content of siloxyl units (I.3) is less than or equal to 1.6 mol per 100 g of polyorganosiloxane C and preferably between 0.1 and 1.5 mol per 100 g of polyorganosiloxane C.

According to another preferred embodiment, the number N1 of siloxyl units (I.1) bearing epoxyfunctional hydrocarbon groups and the number N3 of siloxyl units (I.3) satisfy the following conditions:

$1 \leq N1 \leq 10$ and preferably $1 \leq N1 \leq 5$, and
$3 \leq N3 \leq 20$ and preferably $5 \leq N3 \leq 20$ It is particularly advantageous that the total number N of siloxyl units (I.1) to (I.3) of the polyorganosiloxane C is between 3 and 25 inclusive and more preferably still between 10 and 25.

Preferably, the polyorganosiloxane C has a viscosity (at 25° C.) between 5 and 100 mPa·s and preferably between 5 and 50 mPa·s.

All the viscosities referred to in the present disclosure correspond to a magnitude of so-called "Newtonian" dynamic viscosity at 25° C., that is to say the dynamic viscosity which is measured, in a manner known per se, at a shear rate gradient that is sufficiently low for the measured viscosity to be independent of the rate gradient.

Preferably, for the siloxyl unit (I.1), Y is chosen from the group consisting of the groups (R-1) to (R-4) having the following formulae:

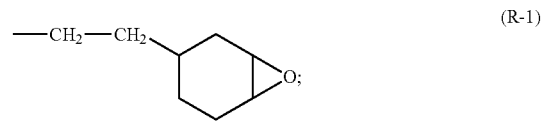

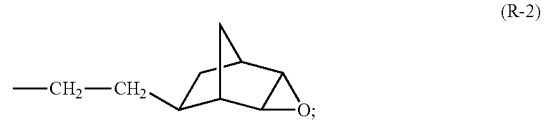

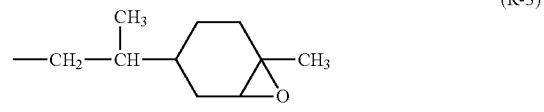

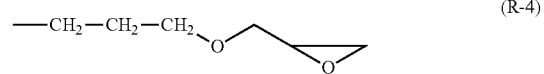

According to a particularly preferred embodiment, the siloxyl unit (I.1) Y is the group (R-4) having the following formula:

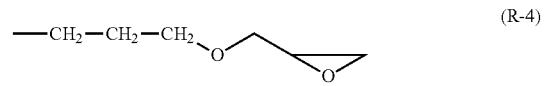

In the whole of the present document, reference is made to elements of conventional nomenclature to designate the siloxyl units M, D, T and Q of the polyorganosiloxanes. As reference manual, mention may be made of: NOLL "*Chemistry and Technology of Silicones*", chapter 1.1, page 1-9, Academic Press, 1968-2$^{nd}$ edition.

To further improve the attachment performance of the polyorganosiloxane C, when the siloxyl unit (I.1) is chosen from the group consisting of the groups:

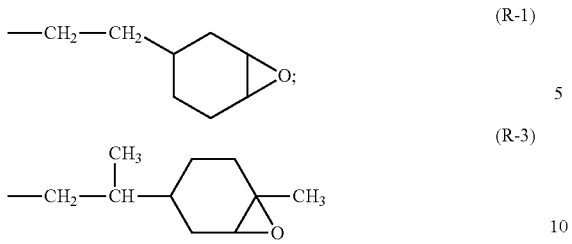

the cross-linking and attachment-promoting additive X may comprise at least one photoinitiator (for example cationic), preferably chosen from onium borates, more preferably from iodonium borates and/or boranes.

By way of example of a photoinitiator, mention may be made of the one which corresponds to the formula:

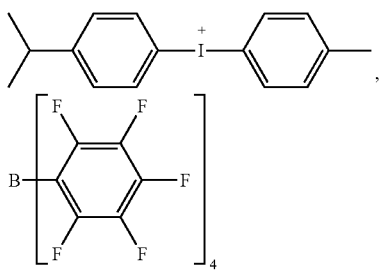

For more details on the appropriate onium borates, reference may be made, for example, to the following patent applications or patents: U.S. Pat. No. 6,864,311B; U.S. Pat. No. 6,291,540B; U.S. Pat. No. 5,468,902B.

The photoinitiator is advantageously diluted in a protic solvent, for example isopropyl alcohol. The dilution rate is for example between 10 and 30%, in particular equal to 20%+/−2.

In the case where the composition comprises a photoinitiator, the coating may be subjected to thermal and/or actinic exposure, for example UV, in order to accelerate the reaction.

For further details on the appropriate boranes, mention may be made, for example, of the following patent applications or patents: U.S. Pat. No. 6,743,883B; US-A-2004-0048975.

According to a preferred embodiment, the attachment-promoting additive X is a clear and homogeneous mixture which comprises, relative to the total weight of the additive X:

from 1 to 100 parts by weight of at least one polyorganosiloxane C, and
from 99 to 0 parts by weight of at least one cross-linking silicone oil D comprising per molecule at least three hydrogen atoms bonded to the silicon.

Preferably, the silicone base B comprises:

(A) at least one alkenylated polyorganosiloxane E comprising at least two siloxyl units (I.4) having the following formula:

 (I.4)

in which:
a=1 or 2, b=0, 1 or 2 and a+b=1, 2 or 3;
W independently represents an alkenyl group, preferably having from 2 to 6 carbon atoms and, more preferably still, a vinyl or allyl group, and
Z independently represents a monovalent hydrocarbon group having from 1 to 30 carbon atoms and preferably chosen from the group consisting of alkyl groups having from 1 to 8 carbon atoms inclusive and aryl groups, and more preferably still chosen from the group consisting of a methyl, ethyl, propyl, 3,3,3-trifluoropropyl, xylyl, tolyl and phenyl radical, (B) optionally at least one cross-linking silicone oil D' comprising per molecule at least three hydrogen atoms bonded to the silicon,
(C) at least one polyaddition catalyst F, preferably a compound of at least one metal belonging to the platinum group;
(D) optionally at least one cross-linking inhibitor G;
(E) optionally an adhesion modulating system H;
(F) optionally at least one diluent I;
(G) optionally at least one anti-misting additive J,
(H) optionally at least one polyorganosiloxane resin K, and
(I) optionally at least one nonfunctionalized polyorganosiloxane L consisting of the siloxyl units (I.5) of formula:

 (I.5)

in which:
a=0, 1, 2 or 3,
$Z^1$ independently represents a monovalent hydrocarbon group having from 1 to 30 carbon atoms and preferably chosen from the group consisting of alkyl groups having from 1 to 8 carbon atoms inclusive and aryl groups, and more preferably still chosen from the group consisting of a methyl, ethyl, propyl, 3,3,3-trifluoropropyl, xylyl, tolyl and phenyl radical.

The cross-linking silicone oils D and D' are preferably polyorganosiloxanes containing siloxyl units having the following formulae (I.6) and optionally (I.7):

 (I.6)

 (I.7)

in which:
a=1 or 2, b=0, 1 or 2 and a+b=1, 2 or 3;
H represents a hydrogen atom,
$L^1$ independently represents a monovalent hydrocarbon group having from 1 to 30 carbon atoms and preferably chosen from the group consisting of alkyl groups having from 1 to 8 carbon atoms inclusive and aryl groups, and more preferably still chosen from the group consisting of a methyl, ethyl, propyl, 3,3,3-trifluoropropyl, xylyl, tolyl and phenyl radical, and
c=0, 1, 2 or 3,
$Z^1$ independently represents a monovalent hydrocarbon group having from 1 to 30 carbon atoms and preferably chosen from the group consisting of alkyl groups having from 1 to 8 carbon atoms inclusive and aryl groups, and more preferably still chosen from the group consisting of a methyl, ethyl, propyl, 3,3,3-trifluoropropyl, xylyl, tolyl and phenyl radical.

The dynamic viscosity ηd (at 25° C.) of these cross-linking silicone oils D and D' are greater than or equal to 5, preferably greater than or equal to 10 and, more preferably still, are between 20 and 1000 mPa·s.

The cross-linking silicone oils D and D' may have a linear, branched or cyclic structure. The degree of polymerization is greater than or equal to 2. More generally, it is less than 5000.

Examples of hydrogenosiloxyl units of formula (I.6) are:
M': $H(CH_3)_2SiO_{1/2}$,
D': $HCH_3SiO_{2/2}$, and
D' with a phenylated group: $H(C_6H_5)SiO_{2/2}$.

Examples of cross-linking silicone oils D and D' are:
$M_2'D_xDy'$: dimethylpolysiloxanes with hydrogenodimethylsilyl ends, poly(dimethylsiloxane) (methyl-hydrogenosiloxy) α,ω-dimethylhydrogeno-siloxane,
$M_2D_xDy'$: copolymers with dimethyl-hydrogenomethylpolysiloxane (dimethyl) units with trimethylsilyl ends,
$M_2'D_xDy'$: copolymers with dimethyl-hydrogenomethylpolysiloxane units with hydrogenodimethylsilyl ends,
$M_2D_x'$: hydrogenomethylpolysiloxanes with trimethylsilyl ends,
$D'_4$: cyclic hydrogenomethylpolysiloxanes,
with x and y being whole or decimal numbers (average value) varying according to the structure used, determined according to the customary techniques in the technical field.

It is advantageous that the alkenylated polyorganosiloxane E has a viscosity (at 25° C.) at least equal to 10 mPa·s, preferably between 50 and 1000 mPa·s.

The alkenylated polyorganosiloxane E may have a linear, branched or cyclic structure. Its degree of polymerization is preferably between 2 and 5000. Examples of siloxyl units of formula (I.4) are the vinyldimethylsiloxane unit, the vinylphenylmethyl-siloxane unit and the vinylsiloxane unit.

Examples of polyorganosiloxanes (I.4) are dimethylpolysiloxanes with dimethylvinylsilyl ends, methylvinyldimethylpolysiloxane copolymers with trimethylsilyl ends, methylvinyldimethylpolysiloxane copolymers with dimethylvinylsilyl ends, cyclic methylvinylpoly-siloxanes.

The polyaddition catalysts F are also well known. Platinum and rhodium compounds are preferably used. It is possible to use in particular complexes of platinum and an organic product described in U.S. Pat. No. 3,159,601, U.S. Pat. No. 3,159,602, U.S. Pat. No. 3,220,972 and European patents EP-A-0 057 459, EP-A-0 188 978 and EP-A-0 190 530, the complexes of platinum and vinylated organo-siloxanes described in U.S. Pat. No. 3,419,593, U.S. Pat. No. 3,715,334, U.S. Pat. No. 3,377,432 and U.S. Pat. No. 3,814,730. The generally preferred catalyst F is platinum. In this case, the quantity by weight of catalyst F, calculated by weight of platinum metal, is generally between 2 and 400 ppm, preferably between 5 and 200 ppm based on the total weight of the polyorganosiloxanes C, D, D' and E.

One of the advantages of the composition according to the invention is that it is possible to use a very low amount of catalyst of the platinum type, that is to say at amounts in the region of 30 ppm based on the total weight of the polyorganosiloxanes C, D, D' and E.

According to a particular embodiment, the quantities of the constituents are such that the [≡SiH]/[≡SiAlkenyl] molar ratio is between 1 and 7, and preferably between 1 and 5 with:
[SiH]=total number of mol of siloxyl units comprising a hydrogen atom bonded to silicon, and
[SiAlkenyl]=total number of mol of siloxyl units comprising an alkenyl radical bonded to silicon.

The cross-linking inhibitor G (or retardant of the addition reaction) may, for its part, be chosen from the following compounds:
a polyorganosiloxanes, advantageously cyclic, and substituted with at least one alkenyl, tetramethyl-vinyltetrasiloxane being particularly preferred,
pyridine,
organic phosphines and phosphites,
unsaturated amides,
alkylated maleates,
and acetylenic alcohols.

These acetylenic alcohols (cf. FR-B-1 528 464 and FR-A-2 372 874), which are part of the preferred thermal blockers for the hydrosilylation reaction, have the formula:

$(R^1)(R^2)C(OH)—C≡CH$ in which formula:
$R^1$ is a linear or branched alkyl radical, or a phenyl radical;
$R^2$ is a hydrogen atom, a linear or branched alkyl radical, or a phenyl radical;
it being optionally possible for the radicals $R^1$, $R^2$ and the carbon atom located at the a position with respect to the triple bond to form a ring; and
the total number of carbon atoms contained in $R^1$ and $R^2$ being at least 5, preferably from 9 to 20.

Said alcohols are preferably chosen from those having a boiling point greater than 250° C. There may be mentioned by way of example:
1-ethynyl-1-cyclohexanol;
3-methyl-1-dodecyn-3-ol;
3,7,11-trimethyl-1-dodecyn-3-ol;
1,1-diphenyl-2-propyn-1-ol;
3-ethyl-6-ethyl-1-nonyn-3-ol;
3-methyl-1-pentadecyn-3-ol.

These α-acetylenic alcohols are commercial products.

Such a cross-linking inhibitor is present in an amount of 3000 ppm at most, preferably in an amount of 100 to 2000 ppm relative to the total weight of the organo-polysiloxanes polyorganosiloxanes C, D, D' and E.

The adhesion-modulating system H is selected from known systems. This may include those described in French patent FR-B-2 450 642, U.S. Pat. No. 3,772,247B or European patent application EP-A-0 601 938. By way of example, mention may be made of the modulators based on:
from 96 to 85 parts by weight of at least one polyorganosiloxane resin (A) of the type: $MD^{Vi}Q$, $MM^{Vi}Q$, $MD^{Vi}T$, $M[M^{hexenyl}]Q$, or $M[M^{allyloxypropyl}]Q$,
from 4 to 15 parts by weight of at least one resin (B) of the type: MD'Q, MDD'Q, MDT', MQ, or MDQ.

With
T': $HSiO_{3/2}$,
D': $H(CH_3)SiO_{2/2}$,
M: $(CH_3)_3SiO_{1/2}$
Q: $SiO_{4/2}$
D: $(CH_3)_2SiO_{2/2}$
$D^{Vi}$: $(CH_3)(vinyl)SiO_{2/2}$
M: $(CH_3)_3SiO_{1/2}$
$M^{Vi}$: $(CH_3)_2(vinyl)SiO_{1/2}$
$M^{hexenyl}$: $(CH_3)_2(hexenyl)SiO_{1/2}$ The composition may also include another attachment-promoting additive. The latter is preferably chosen from epoxy-functional silanes, preferably from the group comprising:
(3,4-epoxycyclohexyl)ethyltriethoxy-silane [Coatosil® 1770],
Tris(3-(trimethoxysilyl)propyl)isocyanurate [A-Link 597],
(gamma-glycidoxypropyl)trimethoxysilane [Dynasilan® GLYMO],
(gamma-methacryloxypropyl)trimethoxysilane [Dynasilan® MEMO],
silicone compounds containing both SiVi groups and epoxy-functional groups, and mixtures thereof.

The concentrations suitable for this other attachment-promoting additive are, for example, between 0.5 and 5%, preferably between 1 and 3% by weight relative to the total weight of the composition.

The diluent I optionally present in the composition is advantageously chosen from α-olefins, in particular those containing from 4 to 15 carbon atoms per molecule.

Other functional additives may be incorporated into the composition. These additives may be chosen from fillers such as for example glass microbeads, anti-misting agents J well known in the technical field.

The preparation of the silicone composition according to the invention, which can be used in particular as coating base for the production of water-repellent and non-stick coatings, this composition being of the type defined above, simply consists in mixing the constituents according to the invention using means and methods of mixing that are known to a person skilled in the art.

These compositions may also be optionally used for the treatment of paper substrates, in order to provide anti-adhesion properties and with improved resistance of the silicone coating in relation to aggressive adhesives (for example some acrylic pressure-sensitive adhesives "PSA").

From a quantitative point of view, it is advantageous, according to the invention, that the concentration of cross-linking and attachment-promoting additive X [expressed as % by weight relative to the total mass of the composition] is between 0.1 and 40, preferably between 0.5 and 20, and more preferably still between 1 and 18.

Another subject of the invention relates to a silicone elastomer which can be obtained by the cross-linking and/or hardening the silicone composition A according to the invention and as described above.

According to another of its aspects, the invention relates to a process for producing a non-stick and water-repellent coating on a substrate, characterized in that it consists in applying on at least one face of this substrate at least one layer of the silicone composition A according to the invention and as described above and in ensuring that this layer cross-links, preferably by activating it by heating.

The silicone composition A according to the invention may be deposited on flexible paper or polymer substrates. For example, as flexible substrate, mention may be made of: polymer films such as polyolefins (for example polyethylene, polypropylene and the like), polyesters (for example PET and the like), paper of various types (supercalendered, coated and the like), cardboard, cellulose sheets or metal sheets. The flexible polyester substrates, for example of the PET type, coated with a non-stick silicone layer, are used as liners for adhesive labels.

The means and methods of mixing are known to the person skilled in the art, for solvent-free compositions or for emulsions.

These compositions may be applied by means of devices used on industrial machines for coating paper such as a five-roll coating head, air knife or equalizer bar systems, on flexible substrates or materials, and then hardened by circulating through tunnel ovens heated to 70-200° C.; the passage time in these ovens depends on the temperature; it is generally of the order of 5 to 15 seconds at a temperature of the order of 100° C. and of the order of 1.5 to 3 seconds at a temperature of the order of 180° C.

Said compositions may be deposited on any flexible material or substrate such as paper of various types (supercalendered, coated and the like), cartons, cellulose sheets, metal sheets, plastic films (polyester, polyethylene, polypropylene and the like).

The quantities of compositions deposited are of the order of 0.5 to 2 g per $m^2$ of surface to be treated, which corresponds to the deposition of layers of the order of 0.5 to 2 µm.

The materials or substrates thus coated may be subsequently brought into contact with any pressure-sensitive adhesive materials such as rubbers, acrylics or the like. The adhesive material is then easily detachable from said substrate or material.

According to another of its aspects, the invention relates to a process for producing a non-stick and water-repellent coating on a support, preferably a polymer film, more preferably a polyester polymer film, characterized in that it consists in applying on this substrate at least one layer of a silicone composition as defined above, and in bringing about the cross-linking of this layer, preferably by activating it by heating.

These compositions may be applied by means of devices used on industrial machines for coating paper such as for example a five-roll coating head, air knife or equalizer bar systems, on flexible substrates or materials, and then hardened by circulating through tunnel ovens heated to 70-200° C.; the passage time in these ovens depends on the temperature; it is generally of the order of 5 to 15 seconds at a temperature of the order of 100° C. and of the order of 1.5 to 3 seconds at a temperature of the order of 180° C.

The quantities of compositions deposited are for example of the order of 0.5 to 2 g per $m^2$ of surface to be treated, which corresponds to the deposition of layers of the order of 0.5 to 2 µm.

The materials or substrates thus coated may be subsequently brought into contact with any pressure-sensitive adhesive materials such as rubbers, acrylics or the like. The adhesive material is then easily detachable from said substrate or material.

According to the invention, for the cross-linking of the coating, the substrate coated with the polyaddition silicone composition is placed at a temperature of preferably less than or equal to 180° C. for less than 10 seconds.

According to another of its subjects, the invention also relates to a substrate characterized in that it comprises at least one non-stick and water-repellent coating obtained according to the process according to the invention and as described above or from silicone composition A according to the invention and as described above.

Preferably, the substrate is a flexible substrate chosen from the group consisting of paper, a polymer film of the polyolefin, polypropylene, polyethylene or polyester type, and a polymer film for protecting the adhesive face of a self adhesive or pressure-sensitive adhesive element.

The non-stick silicone coatings according to the invention are properly and durably attached to the flexible substrates, even under drastic conditions of moisture and temperature, and upon prolonged contact with an acrylic adhesive. They are cross-linked/hardened (few extractable materials). They have a peeling force profile such that the peeling force remains high even at high speed (good anti-adhesion). They are smooth and transparent, which ultimately makes them efficient substrates for labels.

The following examples are given as a guide and should not be considered as limiting the field and spirit of the invention.

I—Preparation of the Polyorganosiloxanes Used in the Additives for Attachment

Example 1

Preparation of a Polyorganosiloxane C1 (Si-Epoxy and SiH Functionalized)—Invention 200 g of toluene and 1.80 g of Pt/C (1.5% of platinum) are introduced into a 1 L reactor. This mixture is subjected to stirring and is heated to 80° C. A mixture of allyl glycidyl ether (AGE) (53 g, 0.465 mol) and polydimethylmethylhydrogenosiloxane (500 g, SiH=1.75 mol) is added dropwise over half an hour. When the addition is complete, the heating is maintained for one hour. The heating is then stopped and after returning to room temperature, the reaction medium is filtered in order to remove the Pt/C. Finally, the reaction medium is devolatilized at 80° C. under 10 mbar for 3 hours in order to give a functionalized silicone oil (516 g—yield: 93%) with the following characteristics:
[SiH]=0.25 mol/100 g; [Epox]=75 mmol/100 g; viscosity=13 cP.

Example 2

Preparation of a Polyorganosiloxane C2 (Si-Epoxy and SiH Functionalized)—Invention 100 g of toluene and 0.51 g of Pt/C (1.5% of platinum) are introduced into a 500 mL reactor. This mixture is subjected to stirring and is heated to 80° C. A mixture of allyl glycidyl ether (AGE) (17.5 g, 0.153 mol) and polydimethylmethylhydrogenosiloxane (150 g, SiH=1.02 mol) is added dropwise over half an hour. When the addition is complete, the heating is maintained for one hour. The heating is then stopped and after returning to room temperature, the reaction medium is filtered in order to remove the Pt/C. Finally, the reaction medium is devolatilized at 80° C. under 10 mbar for 2 hours in order to give a functionalized silicone oil (150 g—yield: 90%) with the following characteristics:
[SiH]=0.53 mol/100 g; [Epox]=71 mmol/100 g; viscosity=21 cP.

Example 3

Preparation of an Additive for Attachment Comp.1 (Si-Epoxy and SiH Functionalized)—Comparative 100 g of toluene and 0.64 g of Pt/C (1.5% of platinum) are introduced into a 500 mL reactor. This mixture is subjected to stirring and is heated to 80° C. A mixture of allyl glycidyl ether (AGE) (47.8 g, 0.419 mol) and polydimethylmethylhydrogenosiloxane (150 g, SiH=1.02 mol) is added dropwise over half an hour. When the addition is complete, the heating is maintained for one hour. The heating is then stopped and after returning to room temperature, the reaction medium is filtered in order to remove the Pt/C. Finally, the reaction medium is devolatilized at 80° C. under 10 mbar for 2 hours in order to give a functionalized silicone oil (169.2 g—yield: 85%) with the following characteristics:
[SiH]=0.33 mol/100 g; [Epox]=181 mmol/100 g; viscosity=47 cP.

Example 4

Preparation of a Polyorganosiloxane C3 (Si-Epoxy and SiH Functionalized)—Invention 100 g of toluene and 0.52 g of Pt/C (1.5% of platinum) are introduced into a 500 mL reactor. This mixture is subjected to stirring and is heated to 80° C. A mixture of allyl glycidyl ether (AGE) (12.8 g, 0.112 mol) and polydimethylmethylhydrogenosiloxane (150 g, SiH=1.59 mol) is added dropwise over half an hour. When the addition is complete, the heating is maintained for one hour. The heating is then stopped and after returning to room temperature, the reaction medium is filtered in order to remove the Pt/C. Finally, the reaction medium is devolatilized at 80° C. under 10 mbar for 2 hours in order to give a functionalized silicone oil (148 g—yield: 91%) with the following characteristics:
[SiH]=0.96 mol/100 g; [Epox]=43 mmol/100 g; viscosity=17 cP.

Example 5

Preparation of an Additive for Attachment Comp.2 (Si-Epoxy and SiH Functionalized)—Comparative 100 g of toluene and 0.60 g of Pt/C (1.5% of platinum) are introduced into a 500 mL reactor. This mixture is subjected to stirring and is heated to 80° C. A mixture of allyl glycidyl ether (AGE) (36.4 g, 0.319 mol) and polydimethylmethylhydrogenosiloxane (150 g, SiH=1.59 mol) is added dropwise over half an hour. When the addition is complete, the heating is maintained for one hour. The heating is then stopped and after returning to room temperature, the reaction medium is filtered in order to remove the Pt/C. Finally, the reaction medium is devolatilized at 80° C. under 10 mbar for 2 hours in order to give a functionalized silicone oil (171.5 g—yield: 92%) with the following characteristics:
[SiH]=0.74 mol/100 g; [Epox]=128 mmol/100 g; viscosity=30 cP.

Example 6

Preparation of a Polyorganosiloxane C4 (Si-Epoxy and SiH Functionalized)—Invention 200 g of toluene and 0.85 g of Pt/C (1.5% of platinum) are introduced into a 1 L reactor. This mixture is subjected to stirring and is heated to 80° C. A mixture of allyl glycidyl ether (AGE) (36 g, 0.317 mol) and polymethylhydrogenosiloxane (423 g, SiH=6.3 mol) is added dropwise over half an hour. When the addition is complete, the heating is maintained for one hour. The heating is then stopped and after returning to room temperature, the reaction medium is filtered in order to remove the Pt/C. Finally, the reaction medium is devolatilized at 80° C. under 10 mbar for 3 hours in order to give a functionalized silicone oil (400 g—yield: 87%) with the following characteristics:
[SiH]=1.33 mol/100 g; [Epox]=40 mmol/100 g; viscosity=15 cP.

Example 7

Preparation of an Additive for Attachment Comp.3 (Si-Epoxy and SiH Functionalized)—Comparative 50 g of toluene and 0.40 g of Pt/C (1.5% of platinum) are introduced into a 500 mL reactor. This mixture is subjected to stirring and is heated to 80° C. A mixture of allyl glycidyl ether (AGE) (23.1 g, 0.203 mol) and polymethylhydrogenosiloxane (100 g, SiH=1.35 mol) is added dropwise over half an hour. When the addition is complete, the heating is maintained for one hour. The heating is then stopped and after returning to room temperature, the reaction medium is filtered in order to remove the Pt/C. Finally, the reaction medium is devolatilized at 80° C. under 10 mbar for 2 hours in order to give a functionalized silicone oil (108.5 g—yield: 88%) with the following characteristics:

[SiH]=0.96 mol/100 g; [Epox]=116 mmol/100 g; viscosity=12 cP.

TABLE 1

Summary of the additives for attachment

| | Additive for attachment | [SiH] mol/100 g of the polyorganosiloxane of the additive | [Epoxy] mmol/100 g of the polyorganosiloxane of the additive | Viscosity (m · Pa · s) |
|---|---|---|---|---|
| Example 1 Invention | C1 | 0.25 | 75 | 13 |
| Example 2 Invention | C2 | 0.53 | 71 | 21 |
| Example 3 Comparative | Comp. 1 | 0.33 | 181 | 47 |
| Example 4 Invention | C3 | 0.96 | 43 | 17 |
| Example 5 Comparative | Comp. 2 | 0.74 | 128 | 30 |
| Example 6 Invention | C4 | 1.33 | 40 | 15 |
| Example 7 Comparative | Comp. 3 | 0.96 | 116 | 12 |

II—Preparation of the Additives for Attachment—Mixtures of a Cross-Linking Silicone Oil D+Polyorganosiloxane C Example 8

In this example, the additives X are prepared from 5 g of a cross-linking silicone oil D (polymethylhydrogenosiloxane, concentration=0.96 mol SiH/100 g of oil) and 100 mg of polyorganosiloxane C (Si-epoxy and SiH functionalized). The appearance of the mixture obtained is specified in table 2 below:

TABLE 2

| Additive for attachment | [Epoxy] mmol/100 g of the polyorganosiloxane of the additive | Appearance of the mixtures of cross-linking silicone oil D + polyorganosiloxane C (Si-epoxy and SiH functionalized) |
|---|---|---|
| C1 Invention | 75 | Clear and homogeneous with no problem of demixing |
| C2 Invention | 71 | Clear and homogeneous with no problem of demixing |
| Comp. 1 Comparative | 181 | Opaque and with demixing during storage |
| C3 Invention | 43 | Clear and homogeneous with no problem of demixing |
| Comp. 2 Comparative | 128 | Opaque and with demixing during storage |
| C4 Invention | 40 | Clear and homogeneous with no problem of demixing |
| Comp. 3 Comparative | 116 | Opaque and with demixing during storage |

III—Example 9

Application Trials 1—Conditions for Coating and Cross-Linking with the Additives for Attachment All the coatings were carried out on a ROTOMEC 5-roll coating machine, with cross-linking of the silicone deposited on a paper substrate (Glassine—Ahlstrom 2010 Classic Yellow/Oven: 120° C./speed: 100 m/min) with a deposition ranging from 0.3 and 1 g/m².

Once the siliconized paper has left the coating machine, it is subjected to controlling of the adhesion and the resistance to abrasion of the coating according to the rub-off test described below, and to the content of extractable materials (non-cross-linked silicone fraction), which makes it possible to characterize the reactivity of the system.

Next, an aging test is carried out, which consists in placing the siliconized paper in a controlled-environment oven at 50° C./70% humidity (accelerated aging) in order to monitor over time the variation of the resistance to abrasion.

The fraction of silicone extractable with MIBK (methyl isobutyl ketone), that is to say the amount of non-cross-linked silicone, is determined by atomic absorption by assaying the silicon in the solvent for extraction.

The rub-off measurement to verify adhesion on the substrate and the resistance to abrasion of the silicon layer consists in rubbing the index finger over the siliconized substrate in order to impose mechanical stresses on the layer. The number of to-and-fro movements with the finger until the phenomenon of rub-off (or rubbing-out) appears, corresponding to a tearing of the silicone coating into shreds, is recorded. The score of 1 shows a poor resistance to abrasion of the silicone layer; the score of 10 shows an excellent resistance to abrasion of the silicone layer.

The results are presented in table 3.

TABLE 3

| Components of the coated silicone composition | Comparative | Comparative | Invention | Invention |
|---|---|---|---|---|
| Vinylated oil (viscosity 350 mPa · s) (parts by weight) | 100 | 100 | 100 | 100 |
| Cross-linking | 4.15 | 4.15 | 4.15 | 4.15 |

TABLE 3-continued

| Components of the coated silicone composition | Comparative | Comparative | Invention | Invention |
|---|---|---|---|---|
| silicone oil D (parts by weight) | | | | |
| Polyorganosiloxane C1 (Si-epoxy and SiH functionalized) (parts by weight) | | | 1 | |
| Polyorganosiloxane C2 (Si-epoxy and SiH functionalized) (parts by weight) | | | | 1 |
| Molar ratio [SiH]/[SiVinyl] unit | 2 | 2 | 2 | 2 |
| Pt catalyst (ppm) | 90 | 50 | 50 | 50 |
| Results | | | | |
| Extractable materials (%) | 7.9 | 9.1 | 6.2 | 8.3 |
| Rub-off machine outlet | 10 | 10 | 10 | 10 |
| Rub-off after 7 days storage at 50° C. and 70% humidity | 10 | 2 | 10 | 10 |
| Rub-off after 14 days storage at 50° C. and 70% humidity | 3 | 1 | 10 | 10 |

IV—Example 10

Application Trials 2—Conditions for Coating and Cross-Linking with the Additives for Attachment The trials of example 9 are repeated but with a change in the substrate and the cross-linking conditions. Film Substrate: PET film/oven: 180° C./Dwell time: 3.6 s/deposition: from 0.3 to 1 g/m²

TABLE 4

| Components of the coated silicone composition | Comparative | Comparative | Invention |
|---|---|---|---|
| Vinylated oil (viscosity 400 mPa·s) (parts by weight) | 100 | 100 | 100 |
| Cross-linking silicone oil D (parts by weight) | 7.1 | 7.1 | 5.6 |
| Polyorganosiloxane C4 (Si-epoxy and SiH functionalized) (parts by weight) | | | 2 |
| Silane C2 (Si-epoxy functionalized, Coatosil® 1770, sold by the company Momentive) (parts by weight) | | 2 | |
| Molar ratio [SiH]/[SiVinyl] unit | 3 | 3 | 3 |
| Pt catalyst (ppm) | 120 | 120 | 120 |
| Extractable materials (%) | 4.4 | 4.5 | 4.8 |
| Rub-off machine outlet | 10 | 10 | 10 |
| Rub-off after 7 days storage at 50° C. and 70% humidity | 1 | 4 | 10 |
| Rub-off after 14 days storage at 50° C. and 70% humidity | 1 | 4 | 10 |

The invention claimed is:

1. A silicone composition A comprising a silicone base B capable of cross-linking or hardening by polyaddition, wherein said silicone composition comprises at least one cross-linking and attachment-promoting additive X comprising at least one polyorganosiloxane C consisting of the siloxyl units (I.1) to (I.3) having formulae:

$$Y_a Z^1_b SiO_{\frac{4-(a+b)}{2}} \quad (I.1)$$

$$Z^2_c SiO_{\frac{4-c}{2}} \quad (I.2)$$

$$H_d Z^3_e SiO_{\frac{4-(d+e)}{2}} \quad (I.3)$$

in which:
a=1 or 2, b=0, 1 or 2 and a+b=1, 2 or 3;
c=1, 2 or 3
d=1 or 2, e=0, 1 or 2 and d+e=1, 2 or 3
Y independently represents an epoxyfunctional hydrocarbon group;
$Z^1$, $Z^2$ and $Z^3$ represent, independently of each other, a monovalent hydrocarbon group selected from the group consisting of alkyl groups having from 1 to 8 carbon atoms inclusive and aryl groups
said polyorganosiloxane C comprising, per molecule, at least one siloxyl unit (I.1) bearing epoxyfunctional hydrocarbon groups and at least three siloxyl units (I.3) bearing hydrogenosiloxyl groups, and
the content of siloxyl units (I.1) is less than or equal to 100 mmol per 100 g of polyorganosiloxane C.

2. The silicone composition A as claimed in claim 1, wherein the content of siloxyl units (I.3) is less than or equal to 1.6 mol per 100 g of polyorganosiloxane C.

3. The silicone composition A as claimed in claim 1, wherein a number N1 of siloxyl units (I.1) bearing epoxyfunctional hydrocarbon groups and a number N3 of siloxyl units (I.3) satisfy the following conditions:
1≤N1≤10, and
3≤N3≤20.

4. The silicone composition A as claimed in claim 1, wherein the total number N of siloxyl units (I.1), (I.2) and (I.3) of the polyorganosiloxane C is from 3 to 25 inclusive.

5. The silicone composition A as claimed in claim 1 wherein said attachment-promoting additive X is a clear and homogeneous mixture which comprises, relative to the total weight of the additive X:
from 1 to 100 parts by weight of at least one polyorganosiloxane C, and
from 99 to 0 parts by weight of at least one cross-linking silicone oil D comprising per molecule at least three hydrogen atoms bonded to silicon.

6. The silicone composition A as claimed claim 1, wherein said silicone base B comprises:
(A) at least one alkenylated polyorganosiloxane E comprising at least two siloxyl units (I.4) comprising formula:

$$W_a Z_b SiO_{\frac{4-(a+b)}{2}} \quad (I.4)$$

in which:
a=1 or 2, b=0, 1 or 2 and a+b=1, 2 or 3;
W independently represents an alkenyl group and
Z independently represents a monovalent hydrocarbon group having from 1 to 30 carbon atoms,
(B) optionally at least one cross-linking silicone oil D' comprising per molecule at least three hydrogen atoms bonded to silicon,
(C) at least one polyaddition catalyst F;
(D) optionally at least one cross-linking inhibitor G;
(E) optionally an adhesion modulating system H;

(F) optionally at least one diluent I;
(G) optionally at least one anti-misting additive J,
(H) optionally at least one polyorganosiloxane resin K, and
(I) optionally at least one nonfunctionalized polyorganosiloxane L having siloxyl units (I.5) of formula:

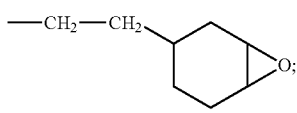 (I.5)

in which:
a=0, 1, 2 or 3,
$Z^1$ independently represents a monovalent hydrocarbon group having from 1 to 30 carbon atoms.

7. The silicone composition A as claimed in claim 1, wherein the siloxyl unit (I.1), Y is selected from the group consisting of the groups (R-1) to (R-4) having formulae:

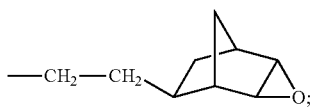 (R-1)

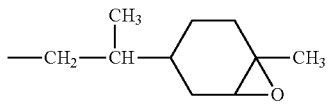 (R-2)

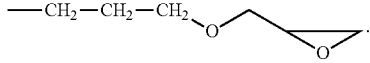 (R-3)

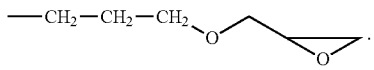 (R-4)

8. The silicone composition A as claimed in claim 7, wherein in said siloxyl unit (I.1) Y is the group (R-4) having formula:

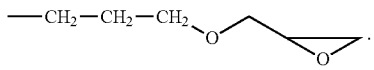 (R-4)

9. The silicone composition A as claimed in claim 1, wherein quantities of constituents are such that a ≡SiH/≡SiAlkenyl molar ratio is from 1 to 7, with:
[SiH]=total number of mol of siloxyl units comprising a hydrogen atom bonded to silicon, and
[SiAlkenyl]=total number of mol of siloxyl units comprising an alkenyl radical bonded to silicon.

10. The silicone composition A as claimed in claim 1, wherein the polyorganosiloxane C has a viscosity at 25° C. from 5 to 100 mPa·s.

11. A silicone elastomer which is obtained by the cross-linking and/or hardening of the silicone composition A according to claim 1.

12. A process for producing a non-stick and water-repellent coating on a substrate, wherein said process comprises applying on at least one face of said substrate at least one layer of the silicone composition A as claimed in claim 1, and ensuring said layer cross-links, optionally by activating said layer by heating.

13. A substrate comprising at least one non-stick and water-repellent coating obtained according to the process as described in claim 12.

14. The substrate as claimed in claim 13, wherein said substrate is a flexible substrate selected from the group consisting of paper, a polymer film of the polyolefin, polypropylene, polyethylene or polyester type, and a polymer film for protecting the adhesive face of a self adhesive or pressure-sensitive adhesive element.

15. A substrate comprising at least one non-stick and water-repellent coating obtained from a silicone composition A as claimed in claim 1.

16. The silicone composition A as claimed in claim 1, wherein Y independently represents an alkyl glycidyl ether; a linear, branched and/or cyclic epoxyalkyl; a linear, branched and/or cyclic epoxyalkenyl; or a carboxylic acid glycidyl ester.

17. The silicone composition A as claimed in claim 1, wherein $Z^1$, $Z^2$ and $Z^3$, independently of each other are selected from the group consisting of a methyl, ethyl, propyl, 3,3,3-trifluoropropyl, ylyl, tolyl and phenyl radical.

18. The silicone composition A as claimed in claim 1, wherein the content of siloxyl units (I.1) is from 20 to 80 mmol per 100 g of polyorganosiloxanes C.

19. The silicone composition A as claimed in claim 1, wherein the content of siloxyl units (I.3) is from 0.1 to 1.5 mol per 100 g of polyorganosiloxane C.

20. The silicone composition A as claimed in claim 1, which is free of solvent.

* * * * *